(12) United States Patent
Aykac et al.

(10) Patent No.: US 7,601,963 B2
(45) Date of Patent: Oct. 13, 2009

(54) HIGH-RESOLUTION DEPTH-OF-INTERACTION PET DETECTOR

(75) Inventors: Mehmet Aykac, Knoxville, TN (US); Ronald Grazioso, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 11/830,342

(22) Filed: Jul. 30, 2007

(65) Prior Publication Data

US 2009/0032717 A1 Feb. 5, 2009

(51) Int. Cl.
*G01T 1/20* (2006.01)
(52) U.S. Cl. .................. 250/370.11; 250/367; 250/368
(58) Field of Classification Search .................. None
See application file for complete search history.

(56) References Cited

U.S. PATENT DOCUMENTS

| | | | |
|---|---|---|---|
| 6,180,946 B1 * | 1/2001 | Ebstein .................. | 250/370.11 |
| 6,288,399 B1 | 9/2001 | Andreaco et al. | |
| 2005/0016950 A1 * | 1/2005 | Andreaco et al. ............. | 216/24 |
| 2006/0192128 A1 * | 8/2006 | Benlloch Bavciera et al. .... | 250/369 |

OTHER PUBLICATIONS

"Scintillation Crystals and its General Characteristics", published Mar. 9, 2006 [Retrieved online Aug. 6, 2008] Retrieved from the internet URL <http:www.mt-berlin.com/frames_cryst/descriptions/scintillators_gen%20.htm>.*
Schmand et al., "Performance Results of a New DOI Detector for a High Resolution PET-LSO Research Tomography HRRT", IEEE Trans. On Nucl. Science, 45(6): 3000-3006, 1998.
Ishibashi, "A GSO Depth of Interaction Detector for PET", IEEE Trans. On Nucl. Science, 45(3): 1078-1082, 1998.
Aykac et al., "New Approach to Obtain High Resolution Using Conventional Block Designs in PET", IEEE Trans. On Nucl. Science, 53(1): 18-24, 2006.
Gagnon et al., "Maximum Likelihood Positioning in the Scintillation Camera Using Depth of Interaction", IEEE Trans. On Medical Imaging, vol. 12, No. 1, Mar. 1993, pp. 101-107.

* cited by examiner

*Primary Examiner*—David P Porta
*Assistant Examiner*—Yara B Green

(57) ABSTRACT

A depth of interaction-sensitive crystal scintillation detector features crystal types that alternate in three-dimensional checkerboard fashion, each type having a different crystal decay time. One or more photosensors are disposed on each of at least two orthogonal surfaces. The scintillation detector provides improved depth of interaction resolution. The different crystal types are identified by pulse shape discrimination processing.

9 Claims, 4 Drawing Sheets

HIGH-RESOLUTION DEPTH-OF-INTERACTION PET DETECTOR

TECHNICAL FIELD

In general, the invention relates to nuclear medical imaging. More particularly, the invention relates to gamma radiation detectors used, for example, in positron emission tomography (PET) scanning.

BACKGROUND

In PET imaging, positrons are emitted from a radiopharmaceutically doped organ or tissue mass of interest. The positrons combine with electrons and are annihilated and, in general, two gamma photons which travel in diametrically opposite directions are generated upon that annihilation. Opposing crystal detectors, which each scintillate upon being struck by a gamma photon, are used to detect the emitted gamma photons. By identifying the location of each of two essentially simultaneous gamma interactions as evidenced by two essentially simultaneous scintillation events, a line in space along which the two gamma photons have traveled (a "line of response," or "LOR") can be determined. The LORs associated with many million gamma interactions with the detectors are calculated and "composited" to generate an image of the organ or tissue mass of interest, as is known in the art.

In some of the earlier PET systems, the gamma detectors could be used only to determine the location of gamma interaction with the detector in two dimensions, which gave rise to parallax errors. More particularly, a conventional two-dimensional measurement of the spatial location of a detected gamma ray absorption event in the scintillating crystal is limited to a two-dimensional point in the X,Y plane of the crystal. However, because the number of scintillation photons reaching each detector element (e.g., either a PMT or a photodiode) is dependent on the solid angle subtended by the area of that detector element to the point of the gamma ray absorption within the crystal, the amount of scintillation photons received by each detector is also a function of the depth of interaction (DOI) of the incident gamma ray within the crystal, i.e., along the Z axis of the crystal.

The DOI is an important parameter when applied to imaging detector geometries where the directions from which incident gamma rays impinge upon the crystal are not all substantially normal to the crystal surface. If incident gamma rays intersect the crystal from directions not normal to the crystal, the unknown depth of interaction of those gamma rays within the crystal will result in an additional uncertainty in the measured position of the interaction because of the parallax effect, if only a two dimensional (i.e., X,Y) spatial location is calculated for such an absorption event. A detailed explanation of the importance of and the problems associated with the DOI is provided in "Maximum Likelihood Positioning in the Scintillation Camera Using Depth of Interaction," D. Gagnon et al., IEEE Transactions on Medical Imaging, Vol. 12, No. 1, March 1993, pp. 101-107.

Thus, parallax errors could be reduced by using depth of interaction (DOI) information to increase the spatial resolution of the system, i.e., to provide the location of gamma interaction in three dimensions in space. In this regard, some research brain PET scanners are able to provide DOI information using so-called "phoswich" (for "phosphorescence sandwich") detectors, constructed as axially stacked scintillators, using a pulse shape discrimination method to minimize parallax error.

An example of such a prior art, DOI-sensitive detector 10 is illustrated in FIG. 1. The detector 10 includes at least two different types of crystal materials, each of which has a different scintillation decay constant, arranged in multiple layers 12, 14, etc., respectively. By discriminating based on the pulse shape, one can differentiate between interaction events that take place in either crystal layer. The layers are, of course, subdivided into individual pixel elements, as shown, to discriminate where within a given layer the interaction has taken place, and reflector partitions may be provided between the crystal elements to better identify the crystal elements in which the interactions take place. Light guide 16, with or without grooves, and photosensors 18 (e.g. photomultiplier tubes or other solid state devise) are employed on a single side of the detector in conventional manner.

There remains a need in the art, however, for further improvement in the light collection efficiency and spatial resolution of such a DOI scintillation detector.

SUMMARY

A DOI-sensitive scintillation detector according to an embodiment of the invention features a plurality of crystal elements of at least two different decay times arranged in a three-dimensional checkerboard arrangement, where the different scintillation decay time characteristics can be achieved by either forming the alternating crystal elements from different crystal types or from similar crystal types with different dopant concentrations, and one or more photosensors disposed on each of at least two orthogonal surfaces of the scintillation detector. The configuration provides higher DOI resolution than detectors according to the prior art, such as phoswich-based detectors.

BRIEF DESCRIPTION OF THE DRAWINGS

The invention will become more clearly understood from the following detailed description in connection with the accompanying drawings, in which.

DETAILED DESCRIPTION OF EXEMPLARY EMBODIMENTS

Figure 1:
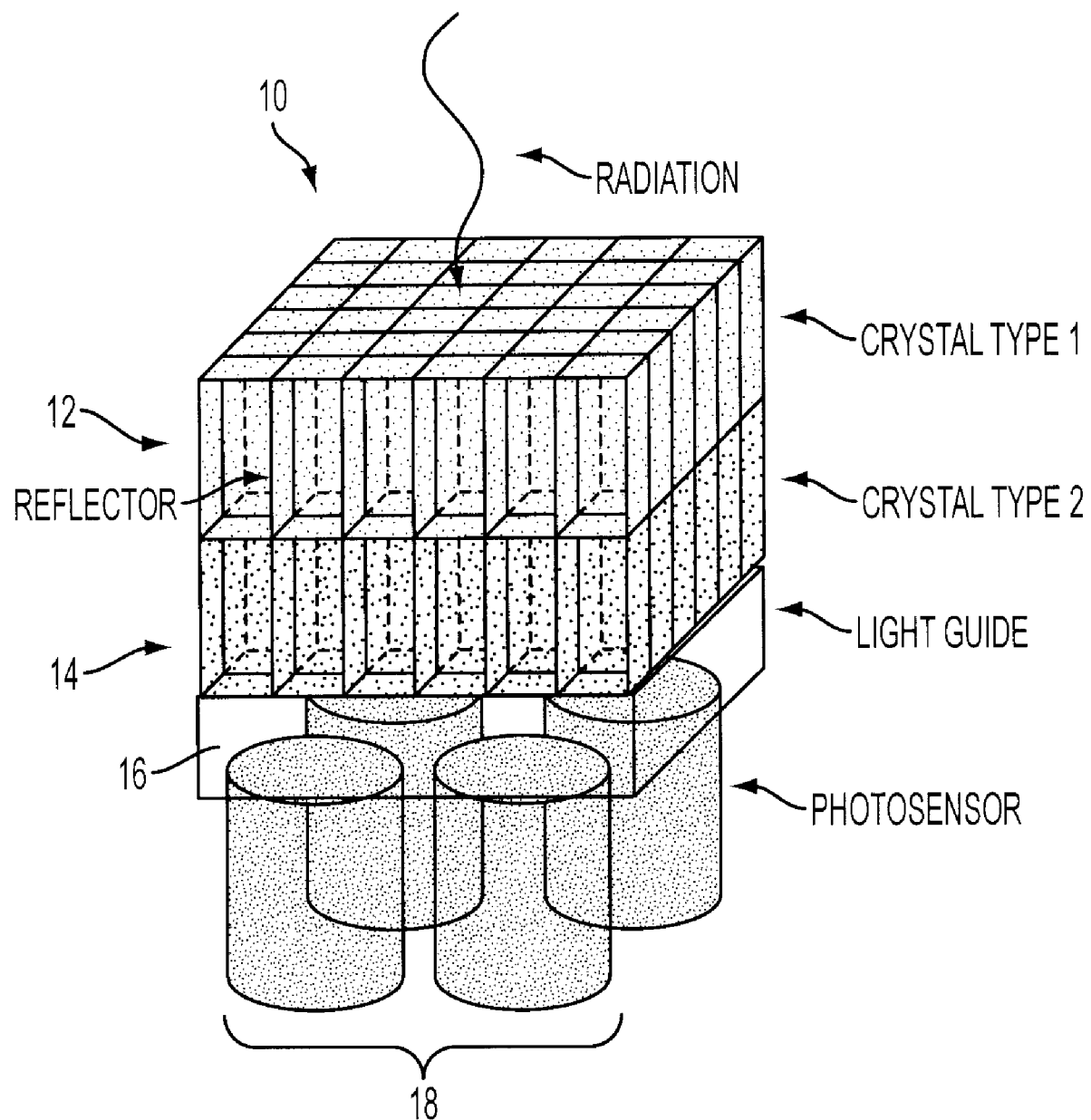
FIG. 1 is a schematic perspective view of a phoswich-type scintillation detector according to the prior art.
Figure 2:
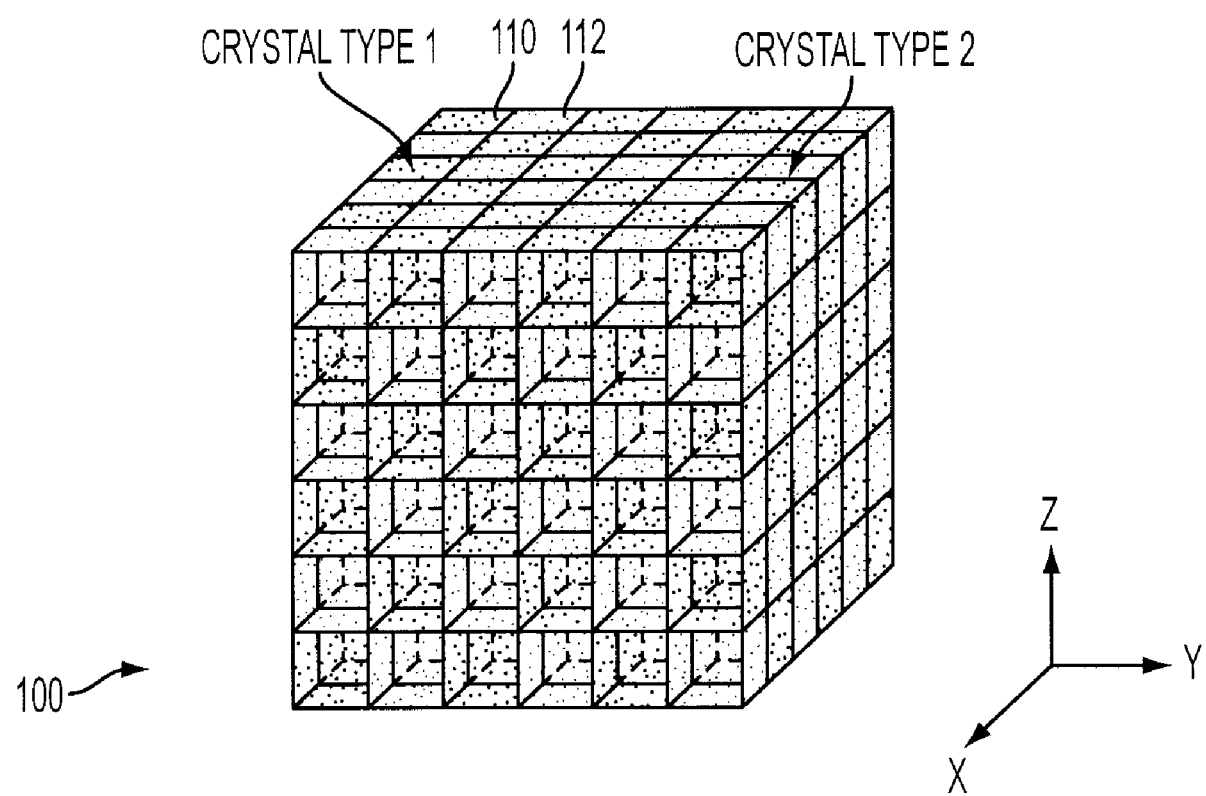
FIG. 2 is a schematic perspective view of one embodiment of a scintillation crystal array arrangement used in a scintillation detector according to the invention.
Figure 3:
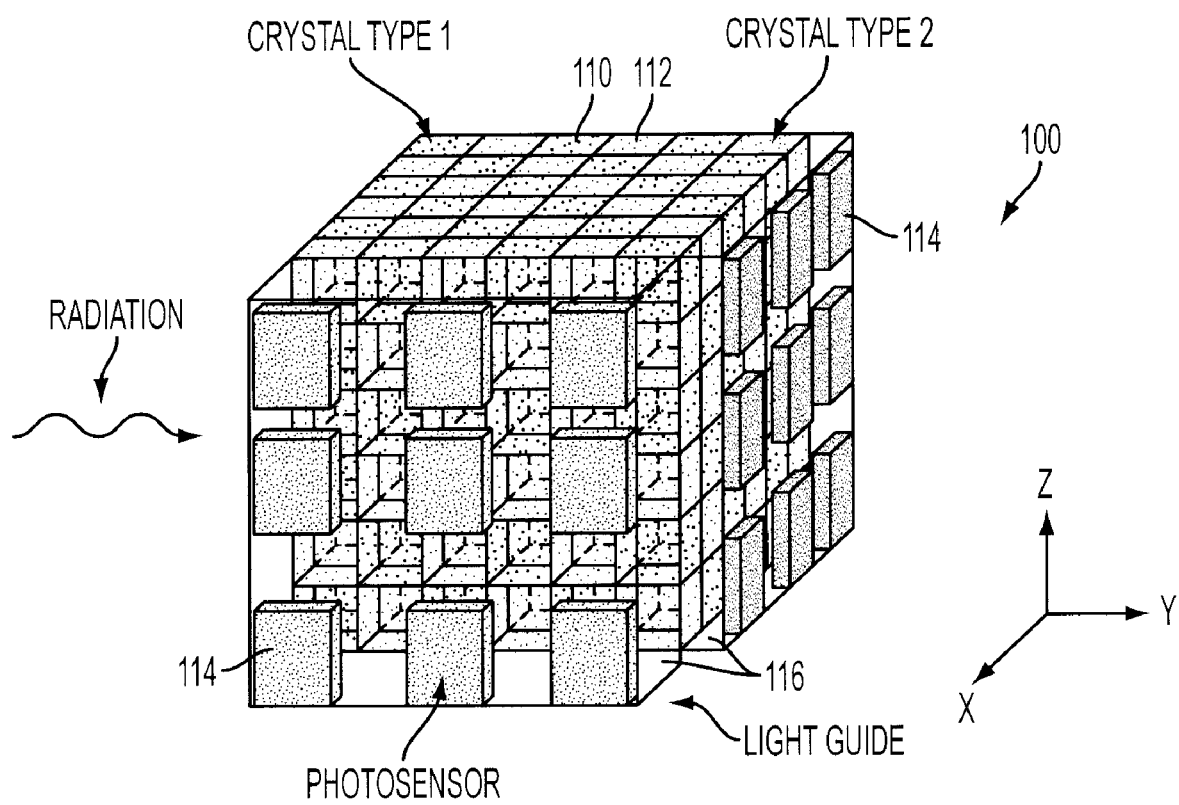
FIG. 3 is a schematic perspective view of a scintillation detector according to one embodiment of the invention, utilizing the scintillation crystal array arrangement shown in FIG. 2.

A block-type scintillation crystal array 100 according to an embodiment of the invention is illustrated in FIGS. 2 and 3. The three-dimensional, DOI-sensitive scintillation array 100 is constructed from a multitude of scintillation crystal pixels of at least two different crystal types (alternating in the case of two), e.g., LSO, GSO, BGO, etc. For example, the array 100 illustrated in FIGS. 2 and 3 is constructed from two different types of crystals 110, 112 represented by the dark-shaded cubic elements (Crystal type 1) and the light-shaded elements (Crystal type 2). The crystal types differ from each other primarily in terms of the fall time constant of gamma-induced scintillation fall-off associated with each type of crystal. (For example, LSO has a constant of approximately 42 nanoseconds; GSO has a constant of approximately 60 nanoseconds; and BGO has a constant of approximately 300 nanoseconds.)

Alternatively, rather than completely different physical compositions, the various crystal types can differ from each other based primarily (or even solely) on dopant concentration levels, where the different levels of dopant concentration impart different scintillation decay characteristics.

Most notably, as best visible in FIG. 2, the optically coupled cubic crystal elements of the different types 110, 112 are arranged in a three-dimensional checkerboard fashion. In other words, for a detector in which two different types of crystal elements are used, the crystal type alternates in both orthogonal X- and Y-directions for each row and each column in a given horizontal layer of the detector 100 throughout the orthogonal Z dimension of the detector. Additionally, the crystal type alternates in both X- and Z-directions for each row and each column for each vertical layer throughout the Y direction of the crystal structure; similarly, the crystal type alternates in both Y- and Z-directions for each row and each column for each vertical layer throughout the X direction of the crystal structure.

For a crystal detector using more than two different types of crystal elements, the elements may vary in repeating succession (e.g., 1,2,3,1,2,3, etc.) in each row/column/layer, and such repeating succession may be termed "alternating" for purposes of this invention as well.

As further shown in FIG. 3, one or more photosensors 114 are optically coupled to each of at least two orthogonal surfaces of the scintillator array 100. Suitably, the photosensors are coupled to the surfaces of the crystal array 100 via light guides 116. Furthermore, the crystal array 100 may be fabricated with reflectors between the various crystal elements; ideally, however, there is little to no space between the individual crystal elements. Light guides 116 may or may not be needed, depending on whether reflectors are provided between the crystal elements. Using little or no reflectors and having photosensors on two or more orthogonal surfaces of the detector provides generally higher light collection capability as compared to the prior art.

Figure 4:
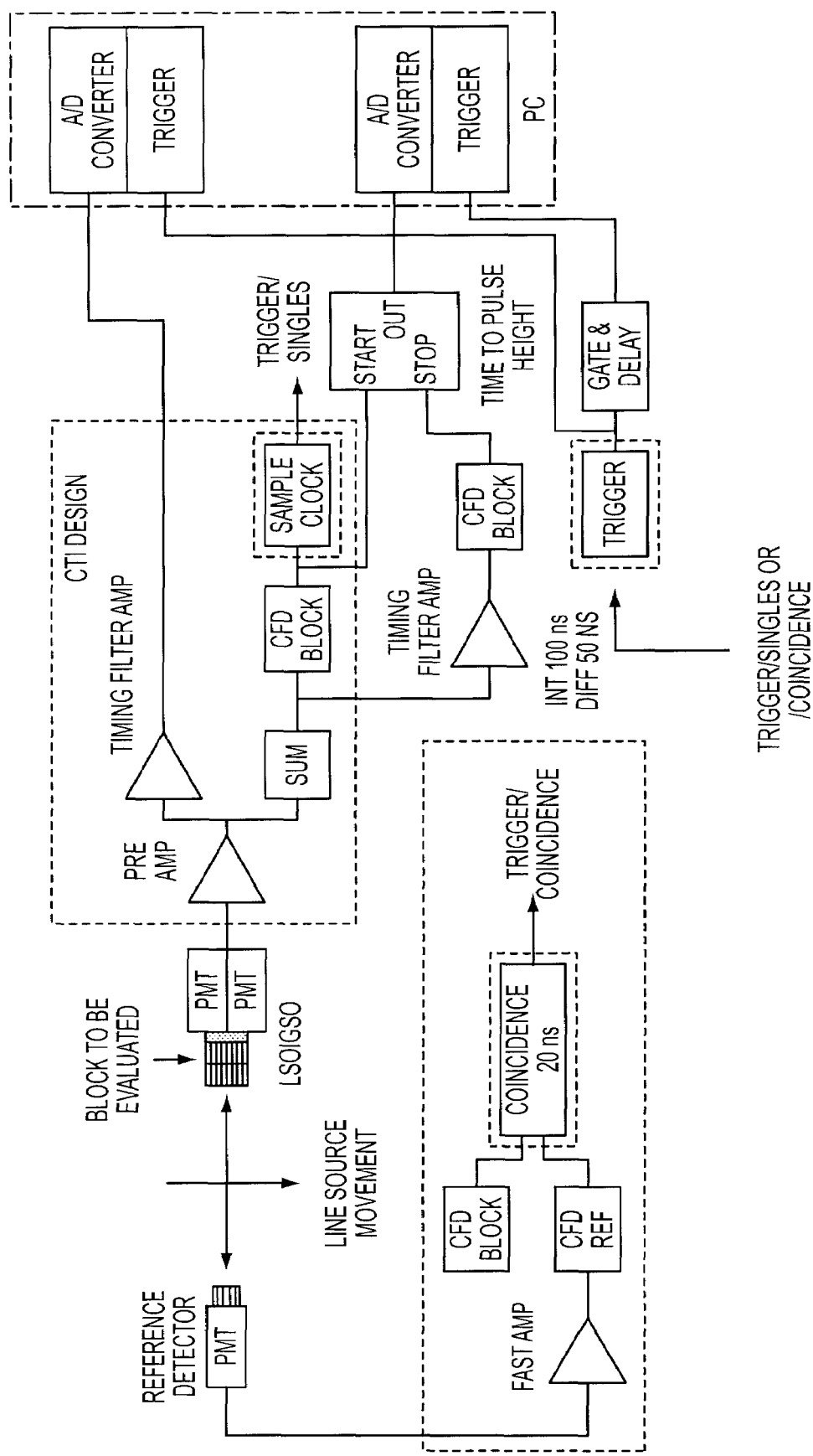
FIG. 4 is a block diagram of an exemplary circuit for pulse shape discrimination, which can be used with the detector in accordance with an embodiment of the present invention.

FIG. 4 is a schematic illustration of a known circuit for identifying the different decay times of the crystals by discriminating different pulse shapes, which can be used in an embodiment of the present invention. The circuit of FIG. 4 is disclosed in U.S. Pat. No. 6,288,399, assigned to the same assignee as the present invention, and which is incorporated herein by reference in its entirety.

As shown in FIG. 4, detector signals are connected to an amplifier module ("CTI Design") that provides a 4 pole semi-Gaussian shaping with a shaping time of 91 ns for each of the detector signals, a sample clock for triggering ADC modules ("PC" block), and a first sum signal of the detector signals ("SUM") for pulse shape discrimination. While the detectors in FIG. 4 are shown as PMTs for purpose of explanation, solid-state detectors such as photosensors 114 of FIG. 3 could be substituted for the PMTs.

A constant fraction discriminator (CFD Block) provides a START signal for a time-to-pulse height converter (TPC). The first sum signal SUM also is differentiated (for example, 50 ns) and integrated (for example, 100 ns) with a fast filter amplifier and connected to a second CFD, which provides a STOP signal for the TPC. The outputs of the shaped PMT signals and the TPC are respectively connected to two ADC modules running under computer control.

For flood source measurements, both ADC modules are triggered with the sample clock signal of the amplifier module, initialized by the sum signal of the detectors. For line spread function measurements, the CFD signal initialized by the sum signal and the CFD signal initialized by a reference detector are connected to a coincidence board with a 20 ns time window, as illustrated in FIG. 4 at "Trigger/Singles or /Coincidence". The reference detector signal is amplified and connected to a CFD "CFD Ref." The CFD signal in coincidence with the block CFD signal gives the trigger for the ADC modules. The data are acquired on a computer in list mode or directly as histogram data and are then transferred for analysis.

For a flood source measurement, a $^{68}$Ge flood source is placed 10 cm from the crystal face to uniformly irradiate the block. The ADC trigger line is connected to the sample clock, as illustrated in FIG. 4 at "Trigger/Singles." For example, two million events may be acquired in list mode and the data stream transferred to a workstation. Software is provided for analyzing the data for identification of the crystals and for calculation of the events, energy centroid and energy resolution per crystal. The data can be processed in two separate runs, where the first run is to determine the thresholds in the zero cross time spectrum of the pulse shape discrimination data. The acquired time entries in the list mode data are sorted into a histogram. A double Gaussian is fitted to the data to define the time boundaries, identifying the layer of the event interaction. A low and a high threshold for all accepted cross over times is set to a predefined percentage of the fit peak maximum of the different crystal decay times in the time distribution spectrum. The intermediate threshold is set to the minimum between the two peaks.

The foregoing description of an embodiment of the invention is for illustration purposes only. The scope of the invention is defined by the following claims.

What is claimed is:

1. A DOI-sensitive scintillation detector, comprising:
a plurality of crystal elements of at least two different alternating crystal decay times arranged in a three-dimensional checkerboard arrangement, the crystal elements having different scintillation decay time characteristics with respect to adjacent elements in each of said three dimensions, such that said checkerboard arrangement exists in two orthogonal surfaces of said detector; and
one or more photosensors disposed on each of at least two orthogonal surfaces of the three-dimensional checkerboard arrangement.

2. The detector of claim 1, wherein the alternating crystal elements have different physical compositions.

3. The detector of claim 1, wherein the alternating crystal elements have different dopant levels.

4. The detector of claim 1, further comprising reflectors between the crystal elements.

5. The detector of claim 1, further comprising a light guide on each of said at least two orthogonal surfaces, to which light guides said photosensors are optically coupled.

6. The detector of claim 1, wherein said photosensors comprise solid-state photosensors.

7. The detector of claim 1, wherein said one or more photosensors comprises a plurality of photosensors arranged in a two-dimensional array on said orthogonal surfaces of said three-dimensional checkerboard arrangement.

8. A DOI-sensitive scintillation detector, comprising:
a plurality of crystal elements of at least two different alternating crystal compositions arranged in a three-dimensional checkerboard arrangement, the different crystal compositions having different scintillation decay time characteristics with respect to adjacent elements in each of said three dimensions, such that said checkerboard arrangement exists in two orthogonal surfaces of said detector; and one or more photosensors disposed on each of at least two orthogonal surfaces of the three-dimensional checkerboard arrangement.

9. A DOI-sensitive scintillation detector, comprising:

a plurality of crystal elements of at least two different alternating crystal dopant levels arranged in a three-dimensional checkerboard arrangement, the different crystal dopant levels causing different scintillation decay time characteristics with respect to adjacent elements in each of said three dimensions, such that said checkerboard arrangement exists in two orthogonal surfaces of said detector; and one or more photosensors disposed on each of at least two orthogonal surfaces of the three-dimensional checkerboard arrangement.

* * * * *